Jan. 26, 1932.   A. P. CARR   1,842,583
DEVICE FOR LANDING AIRCRAFT
Filed March 6, 1929   2 Sheets-Sheet 1
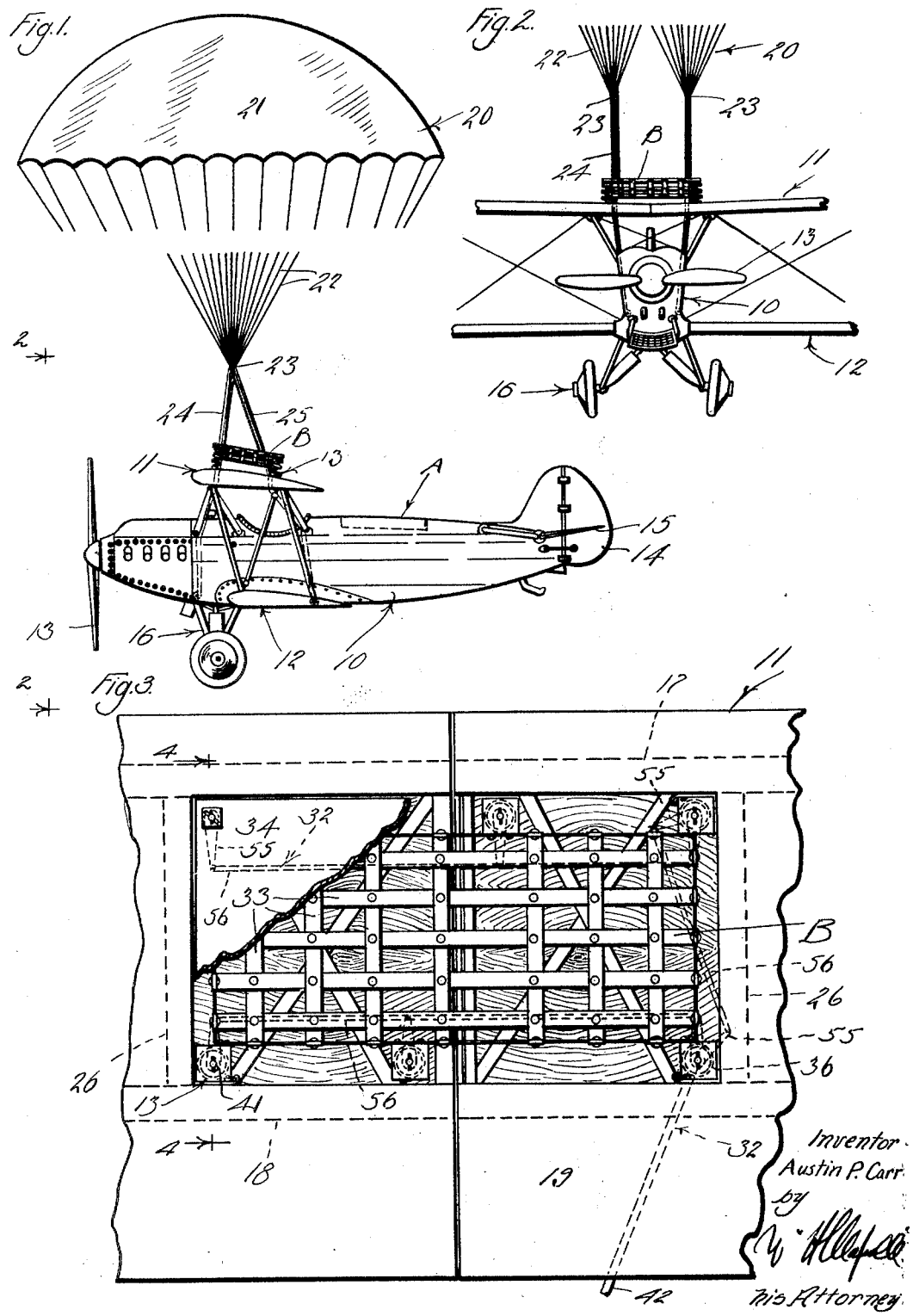

Jan. 26, 1932.  A. P. CARR  1,842,583
DEVICE FOR LANDING AIRCRAFT
Filed March 6, 1929  2 Sheets-Sheet 2
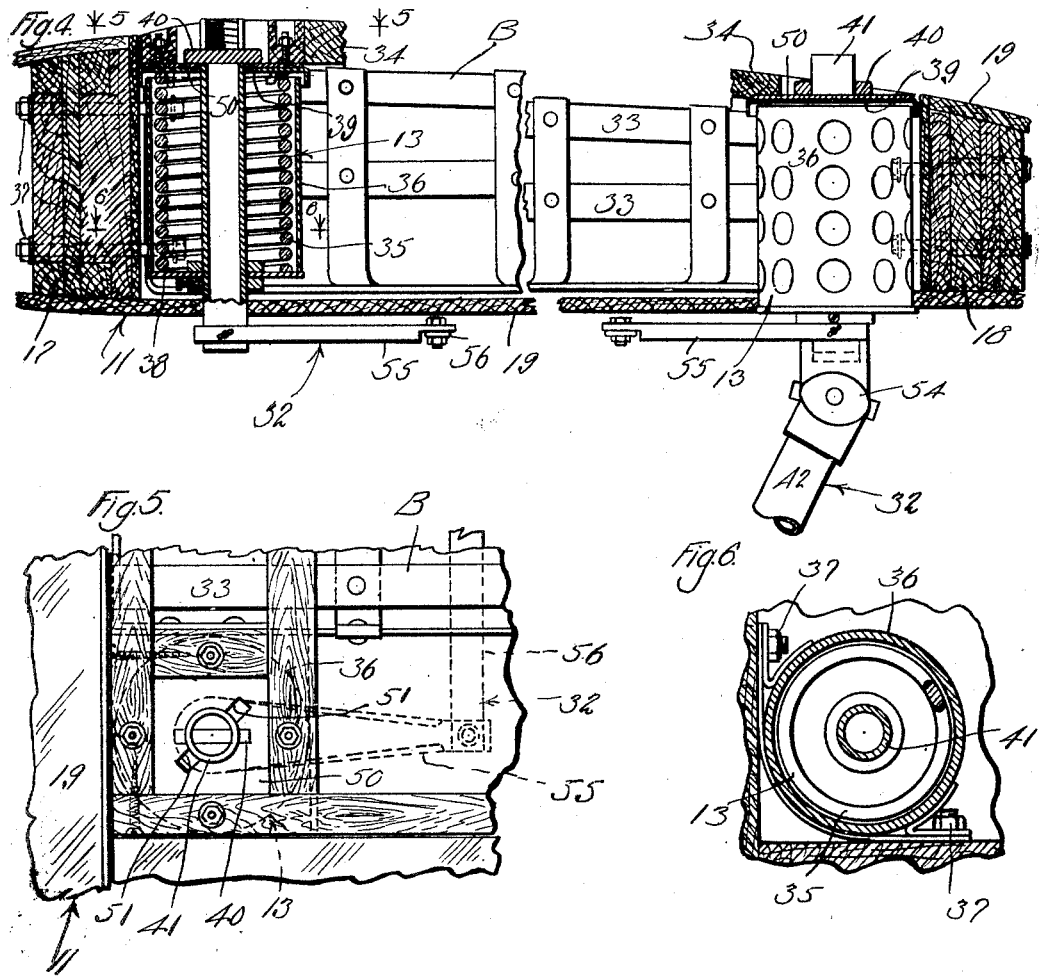
Inventor
Austin P. Carr
by his Attorney Patented Jan. 26, 1932

1,842,583

UNITED STATES PATENT OFFICE

AUSTIN P. CARR, OF LOS ANGELES, CALIFORNIA

DEVICE FOR LANDING AIRCRAFT

Application filed March 6, 1929. Serial No. 344,747.

This invention has to do with a device for landing aircraft and it is a general object of the invention to provide a device whereby an airship or aeroplane can be landed safely in case of emergency.

It is a general object of the present invention to provide a device applicable to an airship or aeroplane, or to any unit or section of an airship or aeroplane, to facilitate landing in the case of an emergency. The device of the present invention includes a parachute and an arrangement for handling a parachute so that a safe landing can be made under practically any conditions.

The present invention is applicable, generally, to aircraft, that is, to lighter than air machines such as airships, to heavier than air machines such as aeroplanes, or to units or sections of such craft. The invention is particularly useful and advantageous as applied to heavier than air machines, for example, aeroplanes, and therefore I will make particular reference to the invention in a form and as applied to an aeroplane, it being understood that such reference is not to be construed as a limitation upon the broader features of the invention.

It is a general object of the present invention to provide a parachute device in connection with an aeroplane, or the like, whereby the parachute is normally held in a compact form so that it does not interfere with other parts of the craft and so that it can be ejected clear of the plane in case of emergency or any time that it may be desired to land the plane by means of the parachute.

It is an object of the invention to provide various improvements in the formation and arrangement of parts in a device of the character mentioned whereby the device is made simple, inexpensive of manufacture, and dependable of operation.

A further object of the present invention is to provide a device of the character mentioned whereby the parachute is effectively and dependably thrown or ejected from the plane to a position where it will independently open, thus avoiding the hazard of the parachute becoming entangled with parts of the aircraft.

The various objects and features of the present invention will be best and more fully understood from the following detailed description of a typical form and application of the invention, throughout which description reference is had to the accompanying drawings, in which:

Fig. 1 is a view showing a typical heavier than air machine, or aeroplane, equipped with the present invention, being a view showing the parachute up, or in open position. Fig. 2 is a view taken as indicated by line 2—2 on Fig. 1. Fig. 3 is an enlarged plan view of the wing, for instance, the upper wing of the aeroplane, taken immediately above the construction provided by this invention, showing the parachute carrier provided by the invention in the unactuated position and with the parachute removed, certain parts appearing in the figure being broken away. Fig. 4 is an enlarged detailed sectional view illustrating the parts shown in Fig. 3, being a view taken as indicated by line 4—4 on Fig. 3. Fig. 5 is an enlarged detail plan view taken as indicated by line 5—5 on Fig. 4 showing the cover of the parachute carrier removed, and Fig. 6 is an enlarged detailed sectional view taken as indicated by line 6—6 on Fig. 4.

As above stated, the present invention is applicable, generally, to aircraft, that is, to machines or devices designed to navigate in the air. For the purpose of facilitating an understanding of the invention, the disclosure will be confined to a typical form of the invention applied to a heavier than air machine, or aeroplane, and when the term aeroplane is used it is to be understood to include aircraft, generally, and not to be confined specifically to a machine of any particular type or design.

The aeroplane illustrated in the drawings includes, generally, a fuselage 10, upper and lower supporting wings 11 and 12, a propeller 13 located at the forward end of the fuselage to be driven by an engine housed within the front end of the fuselage, a rudder 14 at the rear end of the fuselage, ailerons 15 at the rear end of the fuselage, landing gear 16 below the fuselage, and various other parts common to machines of this general character. The machine illustrated may be considered of typical or standard construction, that is, the fuselage may include the usual longérons and other parts common to machines of this character, while the wings may be built in the usual manner so that each includes a front spar 17, a trailing spar 18, ribs 26 extending between the spars, and suitable covering 19 applied to the structure formed by the spars and the ribs.

The present invention is concerned primarily with a device for handling a parachute 20 and is applied to a part of an aeroplane so that it operates to normally carry the parachute in a compact, convenient form in a position ready to be ejected from the aeroplane.

The parachute 20 may be of any suitable type or construction and may be connected with the machine in various manners. In the preferred form of the invention the parachute includes the usual body 21, and tie members or strings 22 attached to the periphery of the body and extending downwardly in two groups to two spaced points 23. In accordance with the preferred form of the invention, the attachment between the aeroplane and the parachute includes two forward supporting lines 24 which extend downwardly from the spaced points 23 past the top longérons of the fuselage and attach to the bottom longérons, and two rear supporting lines 25 which extend downwardly from the points 23 past the top longérons and attach to the bottom longérons. The supporting lines preferably attach to the bottom longérons at the main stations.

The device provided by this invention is preferably located at or in an upwardly facing part of the machine. In the case of an aeroplane, it is preferred to apply the device to the top wing and to locate it centrally between the ends of the wing. The device may be applied to the cabin or other portion of the fuselage; for instance, it may be located as indicated at A in Fig. 1. The device, when applied to a wing, is preferably built into the wing so that it is normally contained entirely within the wing structure and does not project in a manner to interfere with the action of the wing or the passage of the craft through the air. In the case of a wing of typical or standard construction, the device is located between the front spar 17 and the trailing spar 18 and between adjoining ribs 26.

The device includes, generally, a carrier to hold the folded parachute, means 13 for operating the carrier so that the parachute is ejected from the aeroplane, and control means 32 whereby the means 13 is under control of the operator.

The carrier preferably includes a basket structure B, for instance, a rectangular open-topped structure proportioned to properly fit into the space available in the aeroplane, and made sufficiently large to carry the folded parachute. In the construction illustrated the carrier is in the form of an open-top rectangular basket formed of a plurality of straps 33. The straps may be of thin, light metal so that the basket is as light as possible.

In the preferred form of the invention the parachute carrier further includes a top or cover 34 for the basket, the cover being detachable from the basket when the device is operated, as will be hereinafter described. The cover 34 is preferably designed to fit or close the opening provided in the top of the wing 11 to accommodate the construction provided by the invention. The top of the cover 34 may form a continuation of the wing cover so that the surface of the wing is not interrupted by the presence of the device.

The means 13 provided for operating the parachute carrier so that the parachute is thrown or ejected from the aeroplane, is preferably a spring means. In the arrangement shown this means includes a plurality of springs 35 which are normally under compression ready to move the basket so that the parachute is thrown rapidly away from the machine upon being released. The springs 35 embodied in the means 32 are preferably helical springs located around the parachute carrier in a manner such as is illustrated throughout the drawings. Each spring 35 may be carried in a holder or cage 36 mounted in the wing through suitable bolts 37. The cages are located adjacent the sides of the basket. The springs are normally held under compression between the bottoms 38 of the cages and plates 39 which project from the top or upper portion of the basket B to overhang the upper ends of the cages. The ends of the springs may be attached to the cages and plates 39 so that the parachute carrier is tied to the wing and is not detached from the machine when the device is operated as will be hereinafter described.

The control means 32 operates to normally hold the parts positioned as shown in Fig. 4 so that the springs 35 are compressed. In the form of the invention shown the control means includes locking pins 40 carried by spindles 41 to normally lock or hold the parts positioned as shown in Fig. 4, means interconnecting the spindles so that they operate together, and an operating member 42 whereby the spindles can be operated from a point remote from the wing. In the preferred arrangement there is a spindle and locking pin located at each spring. In fact, the spindles 41 are preferably carried by the cages 36 so that they extend upwardly from the bottoms of the cages through the cages and above the plates 39. The locking pins 40 are carried by the upper end portions of the spindles to project from opposite sides of the spindles.

The plates 39 have openings which slidably pass the spindles and when the parts are in the normal position the locking pins overhang the plates, holding the parachute carrier down and the springs compressed. In the preferred construction the cover 34 is provided with plate parts 50 which fit over the spindles in the same manner as the plates 39 and which rest on the plates 39 when the parts are positioned as shown in Fig. 4. The locking pins engage over the plates 50 and thus hold the cover 34 at the same time that they hold the parachute-carrying basket B.

The plates 50 and 39 have registering openings or notches 51 at the openings which pass the spindles adapted to pass the locking pins to allow the plates 39 and 50 to pass off of the spindles. It will thus be apparent that the release of the parachute carrier is controlled by rotation of the spindles and how the spindles may be rotated from positions where the pins 40 hold the carrier down to positions where the pins register with the notches 51, allowing the springs to move the carrier up, or away from the wing.

The means provided for interconnecting the spindles 40 so that they operate simultaneously may include lever arms 55 on the lower ends of the spindles and links which serve to connect the various lever arms. The operating member or means 42 may be any device or equipment operable to rotate the spindles. I have shown a rod extending from one of the spindles 41 to a point convenient for the operator. In the particular case illustrated the operating rod 42 is shown connected with one of the spindles through a suitable universal joint 54.

Under normal conditions the parachute is folded so that it is compact and fits neatly in the basket B of the carrier. The basket containing the parachute, and with the cover 34 applied over the parachute, is arranged in the down position or within the wing, as shown in Fig. 4, the locking pins 40 being positioned with reference to the notches 51 so that they hold the parts in this position. In the case of an emergency, or whenever it is desired to release the parachute, the operating member 42 is rotated so that the spindles turn to bring the locking pins 40 into register with the notches 51. This allows the springs 35 to move the basket and cover of the carrier upwardly with great force and speed, causing the cover to be thrown free of the aeroplane and the parachute to be thrown clear of the various parts of the aeroplane so that it is free to open properly. The movement of the parachute-carrying basket is limited, however. The springs operate with great force and speed in order to throw the parachute far from the aeroplane so that it positively clears the various parts of the aeroplane and is free to open.

From the foregoing description it will be apparent that the present invention provides a construction applicable to an aeroplane without encumbering or complicating the aeroplane. Further, it is to be noted that the device of this invention is simple of construction and operation, making it practical and dependable. The device is without complicated or delicate parts subject to failure and is therefore practical and reliable.

Having described only a typical, preferred form of my invention, I do not wish to limit myself to the specific details set forth, but wish to reserve to myself any changes or variations that may appear to those skilled in the art or fall within the scope of the following claims:

Having described my invention, I claim:

1. In combination, an aeroplane, a parachute, a carrier for the parachute to be mounted in the aeroplane, means for projecting the carrier bodily so that the parachute is ejected from the aeroplane and the carrier, and means for releasably holding the carrier against operation including, a locking pin engaging the carrier to hold it, and a spindle carrying the pin operable by rotation to release the pin from the carrier.

2. In combination, an aeroplane, a parachute, a carrier encasing the parachute to be mounted in the aeroplane, means for projecting the carrier outwardly so that the parachute is ejected from the aeroplane and the carrier, and means for releasably holding the carrier against operation including, a locking pin engaging the carrier to hold it against movement, a rotatable spindle for operating the pin to release the carrier, and means for rotating the spindle.

3. In combination, an aeroplane, a parachute, a carrier encasing the parachute to be mounted in the aeroplane, means for operating the carrier outwardly so that the parachute is ejected from the aeroplane and the carrier, a cover to be arranged over the carrier, and means for releasably holding the cover and the carrier including locking pins and rotatable spindles carrying the pins.

4. In combination, an aeroplane, a parachute, a carrier encasing the parachute to be mounted in the aeroplane, means for operating the carrier outward bodily so that the parachute is ejected from the aeroplane, and means for releasably holding the carrier against operation including, a plurality of locking pins, rotatable spindles carrying the pins, means interconnecting the spindles, and means for rotating the spindles.

5. In combination, an aeroplane, a parachute, a carrier for the parachute to be mounted in the aeroplane, means for operating the carrier outwardly as a unit so that the parachute is ejected from the aeroplane, and means for releasably holding the carrier against operation including, a plurality of locking pins engaging the carrier, rotatable spindles carrying the pins, lever arms on the spindles, links connecting the lever arms, and means for rotating one of the spindles to release the pins from the carrier.

6. In combination, an aeroplane, a parachute, a carrier encasing the parachute normally mounted in the aeroplane, a part projecting from the carrier, an operating spring engaging said part to project the carrier a limited distance from the aeroplane, and means engaging said part to releasably hold the carrier against operation including a locking pin engaging said part, and a rotatable spindle carrying the pin.

7. A device for landing an aeroplane, including, a shiftable carrier disposed in a part of the aeroplane, a parachute in the carrier and permanently attached to the aeroplane, means for forcibly projecting the carrier a limited distance from the aeroplane to catapult the parachute from the aeroplane, and releasable means normally holding the carrier against movement, including a part on the carrier having an opening, a rotatable spindle, and a pin on the spindle engaging said part adapted to pass through said opening upon rotation of the spindle.

In witness that I claim the foregoing I have hereunto subscribed my name this 27th day of February, 1929.

AUSTIN P. CARR.